Dec. 6, 1927.

E. STAUDER 1,651,846

WOODWORKING MACHINE

Filed Feb. 17, 1926

INVENTOR
Emanuel Stauder
BY
his ATTORNEYS

Dec. 6, 1927. 1,651,846
E. STAUDER
WOODWORKING MACHINE
Filed Feb. 17, 1926 2 Sheets-Sheet 2
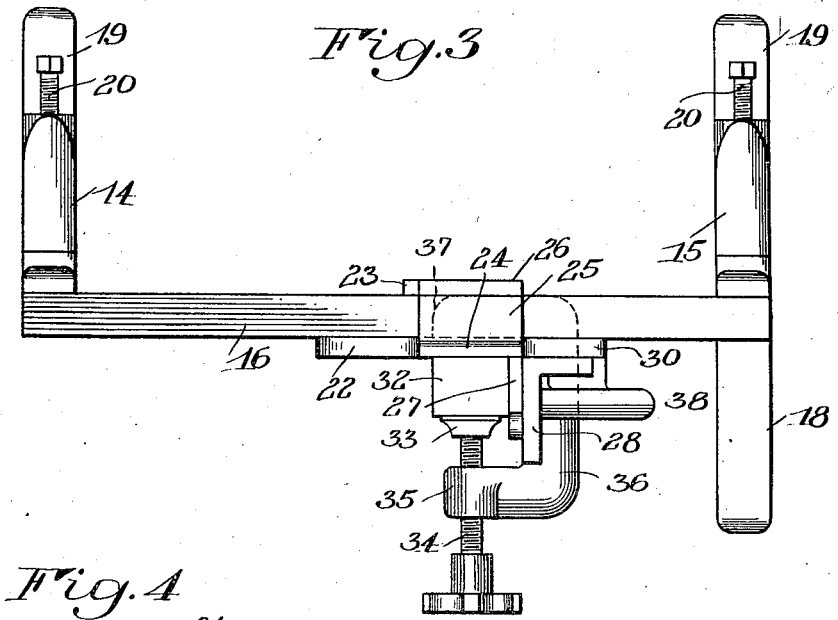
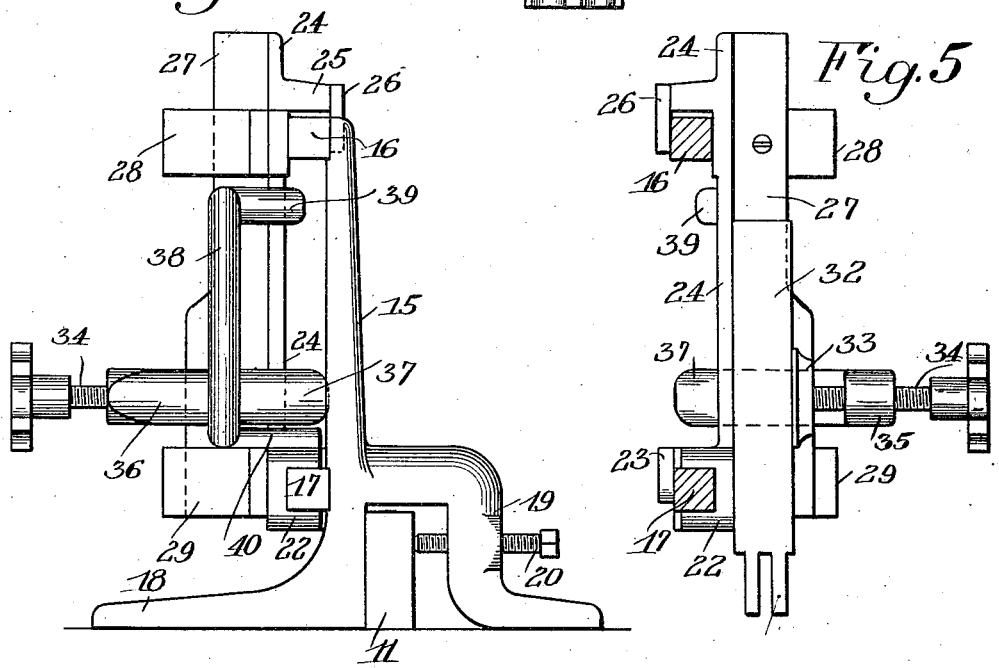
INVENTOR
Emanuel Stauder
BY
his ATTORNEYS Patented Dec. 6, 1927.

1,651,846

UNITED STATES PATENT OFFICE.

EMANUEL STAUDER, OF ROCHESTER, NEW YORK, ASSIGNOR TO HUTHER BROTHERS SAW MFG. COMPANY, OF ROCHESTER, NEW YORK, A CORPORATION OF NEW YORK.

WOODWORKING MACHINE.

Application filed February 17, 1926. Serial No. 88,903.

The present invention relates to improvements in wood working machines and has for one object to provide an improved work holder or carriage which can be quickly connected with and detached from a saw table and which may be readily advanced and retracted manually to move the work to and from engagement with the revolving saw or other cutting tool.

A further object of the invention is to provide a work holding carriage and a frame therefor adapted to be quickly clamped upon the upstanding work guide of a saw table of the type in which the revolving saw or cutter projects through the table to operate on the advancing work supported by the table and kept in proper alinement by the guide.

To these and other ends, the invention resides in certain improvements and combinations of parts, all as will be hereinafter more fully described, the novel features being pointed out in the claims at the end of the specification.

In the drawings:—

Figure 3 is a top plan view of the same;

Figure 4 is an end elevation looking from the right as viewed in Figure 3, and

Figure 5 is a sectional elevation taken on line 5ª—5ª of Figure 2.

Similar reference numerals throughout the several views indicate the same parts.

Figure 1:
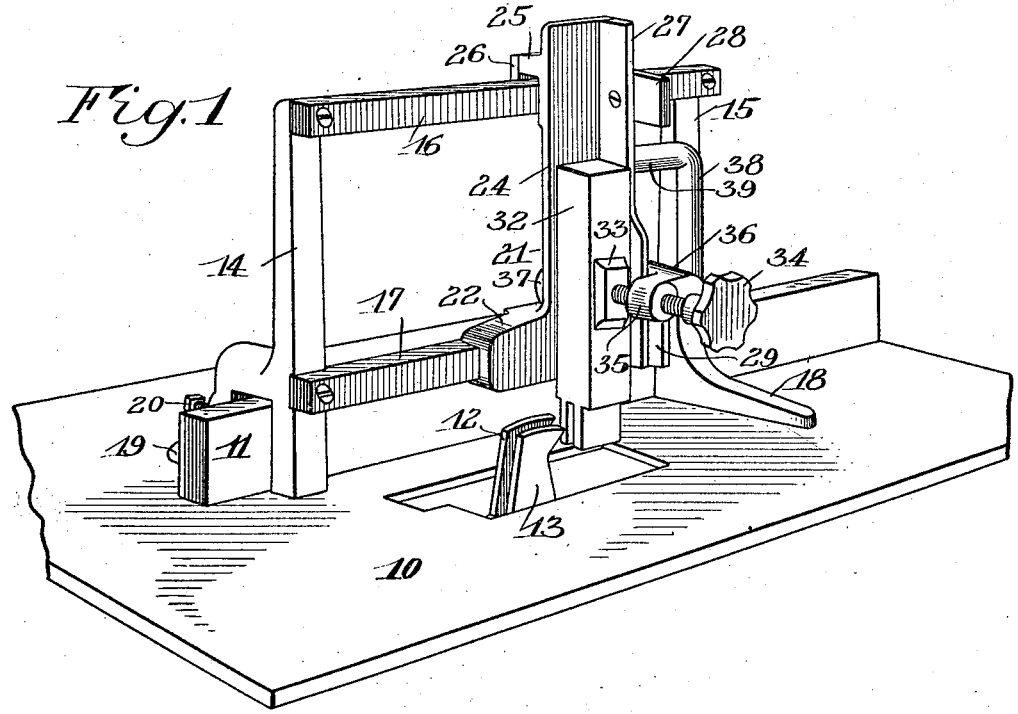
Figure 1 is a view in perspective embodying one form of the invention.

Referring to the drawings, 10 represents a saw table of a well known type provided with the usual upstanding work guide 11 for maintaining the advancing work in proper alinement with the revolving cutters 12 and 13 projecting through the table as shown in Figure 1.

The present invention embodies a support or frame comprising a pair of standards 14 and 15 connected by the upper and lower rails or tie members 16 and 17, respectively. The standards are preferably forked at their lower ends to receive the upstanding table portion 11 forming, in the present instance, the usual guide for the work as ordinarily employed in wood-working machines of this class. The right hand standard is provided with a forwardly extending foot or elongated base portion 18 while both standards are provided with rearwardly extending table engaging portions 19 whereby a three-point support for the frame is afforded. The base portions 19 are each provided with a screw 20 by which the frame is detachably clamped upon the table.

Figure 2:
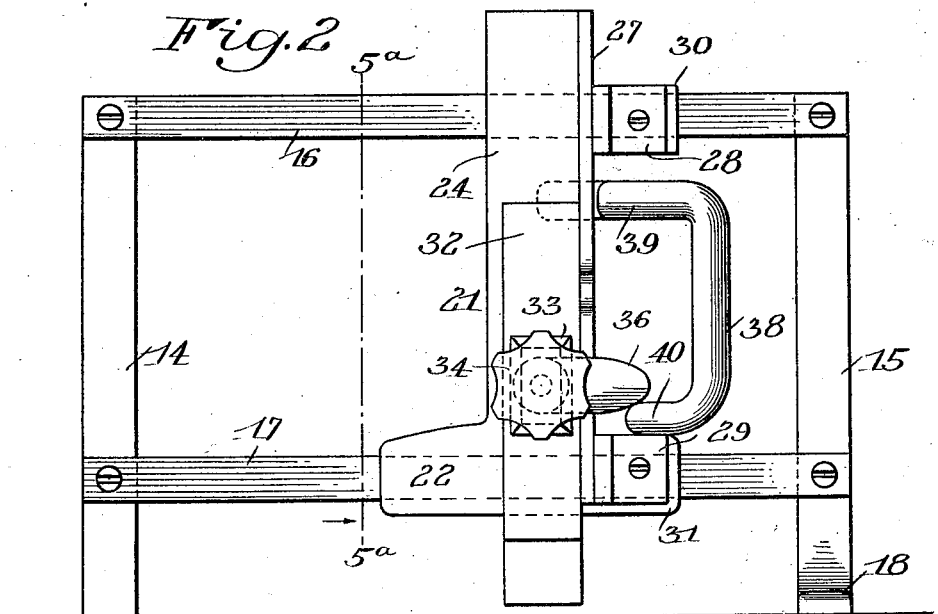
Figure 2 is a front elevation of the machine shown in Figure 1 with the saw table omitted.

The work holder or carriage which is supported and guided by the upper and lower rails 16 and 17 is in the form of a slide, indicated generally at 21, and includes an elongated base or bearing 22 preferably disposed upon the lower rail 17 and engaging the latter on three sides thereof and being secured by a retaining plate 23 at the back of the rail 17. Extending upwardly from the base 22 is a plate 24 slidably engaging the front face of the upper rail 16, said plate having a rearwardly extending portion 25 provided with a downwardly projecting portion 26 engaging the rear face of the rail 16 whereby the upper end of the carriage is guided by said rail. Disposed at a right angle to the plate 24 is a forwardly projecting plate 27 which may either be integral with the plate 24 or detachably secured thereon. In the present instance the plate 27 is connected with upper and lower angle brackets 28 and 29, respectively, which are in turn connected with the laterally extending lugs 30 and 31 projecting from the plate 24 as shown in Figure 2, the lugs being preferably adapted to slidably engage the upper and lower rails 16 and 17, respectively. The plate members 24 and 27 form an angular bracket for receiving a vertically disposed work piece 32 adapted to be held by a clamping block 33 loosely disposed on the inner end of a clamping screw 34, threaded through an arm 35 of a U-shaped bracket 36, the rear arm 37 of which is bolted or otherwise secured to the rear face of the upstanding plate 24. The work carriage is provided with a handle 38 by which it is reciprocated manually to move the work to and from the revolving saws or cutters 12 and 13. The handle may be constructed in any desired manner but preferably as shown, having its upper end 39 bent to extend rearwardly of the plate 24 with which it is suitably connected and having its lower end 40 bent rearwardly and connected with the carriage base 22.

The work is held by the carriage in a vertical position at a right angle to the face of the table and is advanced into engagement with the saw or cutting tool by gripping the handle 38 and pushing the carriage forwardly until the cutting operation is completed, after which the carriage is retracted by the operator, the clamping screw 34 being then loosened and the work removed.

Various classes of work may be clamped upon the carriage and advanced into engagement with the cutting tool or tools, depending upon the number of cuts to be made. As one example of the character of work which can be turned out with the present machine, I have shown a work piece having a pair of tennons formed thereon by the cutting tools 12 and 13, it being understood however that the machine may be used otherwise than as a tennoning machine.

I claim as my invention:

1. In combination, a saw table, a revoluble tool projecting upwardly through the table, an upstanding frame secured upon the table in spaced relation to the tool, a work holder slidable upon the frame comprising angularly disposed portions adapted to engage a vertically positioned work piece on two adjacent sides thereof, means upon the holder for clamping the work thereon and means for reciprocating the holder upon the frame.

2. In combination, a saw table having an upstanding work guide thereon, a saw projecting upwardly through the table in spaced relation to and independently of the guide, a frame detachably clamped upon the guide including upper and lower members and a work holding carriage slidable upon said members and including clamping means for positioning the work so that its lower extremity can be moved into engagement with the saw.

3. In combination, a saw table having an upstanding portion thereon, a revoluble saw projecting through the table, upwardly projecting standards having base portions adapted to detachably receive said upstanding table portions, connecting means between said standards and a work carriage reciprocably mounted upon said connecting means to permit the work to be moved to and from the saw.

4. In a device of the class described, a pair of standards forked at their lower ends to receive the upstanding work guide of a saw table, means carried by said forked portions for clamping the same upon said guide, connecting means between said standards, and a work carriage slidable upon the connecting means and including clamping means for the work.

5. In a device of the class described, a pair of standards adapted for connection with a saw table, connecting means between said standards, a work holding carriage slidably mounted upon said connecting means and comprising angularly disposed members for receiving and engaging adjacent sides of a work piece, a clamping element on one of said members for the work, and means by which the carriage is adapted to be manually reciprocated to and from operating position with respect to a saw projecting through said table.

6. In a device of the class described, a pair of standards adapted for connection with a saw table, connecting means for the standards, a vertically extending work carriage slidably disposed upon said connecting means and embodying angularly disposed plate members for receiving and engaging adjacent sides of a vertically disposed work piece, a bracket on the carriage and a work clamping device connected with the bracket and adapted to engage one of the vertical faces of the work piece.

7. In a device of the class described, a pair of standards adapted for connection with a saw table or the like, upper and lower connecting members for the standards, a work carriage slidably supported by one of said connecting members and adapted to be guided by the other, said carriage comprising vertically extending angularly disposed plates for receiving and engaging adjacent sides of a work piece, clamping means for the work, and a handle connected with the carriage for moving it upon said connecting members.

8. In a device of the class described, a pair of standards adapted for connection with a saw table, upper and lower connecting members between the standards, a work carriage embodying a vertically extending angle bracket having at one end a supporting head slidably mounted upon one of said connecting members and provided at its other end with guiding means slidably engaging the other connecting member, an arm secured upon said bracket, a screw threaded through the arm and provided with a work engaging member for clamping the work upon the bracket, and a handle connected with the bracket.

9. In combination, a saw table having a saw projecting upwardly therethrough, an upstanding frame secured upon the table in spaced relation to and independently of the saw, a vertically extending support reciprocally mounted upon the frame toward and from the saw and including angularly disposed portions adapted to receive and engage a vertically disposed work piece on adjacent sides thereof, a bracket on the support and a clamping screw carried by the bracket and adapted to secure the work piece upon the support.

10. In combination, a table having a cutting tool projecting upwardly therethrough, an upstanding frame on the table spaced from and independent of the tool, a support reciprocally mounted upon the frame toward and from the tool and comprising a pair of angularly disposed vertically extending plates for receiving adjacent faces of a vertically extending work piece, a bracket secured to one of the plates including a laterally extending arm and a clamping screw threaded through said arm at a point between opposite sides of the work piece and adapted to clamp the latter upon the support.

EMANUEL STAUDER.